US009531592B2

(12) United States Patent
Rose et al.

(10) Patent No.: US 9,531,592 B2
(45) Date of Patent: Dec. 27, 2016

(54) DISTRIBUTED METHOD FOR SELECTING A CONFIGURATION IN MOBILE NETWORKS

(71) Applicant: THALES, Neuilly-sur-Seine (FR)

(72) Inventors: Luca Rose, Gennevilliers (FR); Christophe Le Martret, Gennevilliers (FR); Merouane Debbah, Gif sur Yvette (FR)

(73) Assignee: Thales, Courbevoie (FR)

( * ) Notice: Subject to any disclaimer, the term of this patent is extended or adjusted under 35 U.S.C. 154(b) by 151 days.

(21) Appl. No.: 14/247,076

(22) Filed: Apr. 7, 2014

(65) Prior Publication Data
US 2014/0301245 A1 Oct. 9, 2014

(30) Foreign Application Priority Data

Apr. 8, 2013 (FR) .................................... 13 00804

(51) Int. Cl.
*H04L 12/24* (2006.01)
*H04W 72/08* (2009.01)
*H04W 84/18* (2009.01)

(52) U.S. Cl.
CPC ........ *H04L 41/0823* (2013.01); *H04W 72/085* (2013.01); *H04W 84/18* (2013.01)

(58) Field of Classification Search
None
See application file for complete search history.

(56) References Cited

U.S. PATENT DOCUMENTS

| 2003/0214967 A1* | 11/2003 | Heberling | H04W 24/00 370/437 |
| 2006/0140135 A1* | 6/2006 | Bonta | H04L 45/04 370/254 |

(Continued)

FOREIGN PATENT DOCUMENTS

| WO | 2009/018251 A1 | 2/2009 |
| WO | 2013/000068 A1 | 1/2013 |

OTHER PUBLICATIONS

Ho Ting Cheng, et al., "Pareto Optimal Resource Management for Wireless Mesh Networks with QoS Assurance: Joint Note Clustering and Subcarrier Allocation", IEEE Transactions on Wireless Communications, Mar. 1, 2009, pp. 1573-1583, vol. 8, No. 3, IEEE Service Center, Piscataway, NJ, USA, XP011253460.

*Primary Examiner* — Duc Duong
(74) *Attorney, Agent, or Firm* — Baker & Hostetler LLP (57) ABSTRACT

A method for determining the configuration of a set of nodes and/or links of a cluster possessing a cluster head comprises: triggering an information request by interrogating one or more nodes or links and asking the said nodes or the said links to evaluate for each communication channel an index of communication quality, and then selecting a configuration when the cluster head has received the indices of communication quality; verifying whether the indices of quality received comply with a given constraint, retaining the indices which satisfy the largest number of nodes or links, and triggering a configuration selection procedure; if the configuration retained satisfies the set of nodes or links interrogated, then updating the list of channels and communicating this configuration to the nodes or links of the cluster; if not, updating the list of communication channels, or remaining in the initial configuration of the set of nodes or links.

11 Claims, 3 Drawing Sheets

(56) References Cited

U.S. PATENT DOCUMENTS

| | | | |
|---|---|---|---|
| 2007/0297374 A1* | 12/2007 | El-Damhougy | H04W 40/24 370/338 |
| 2009/0092112 A1* | 4/2009 | Kim | H04W 84/20 370/338 |
| 2011/0275382 A1* | 11/2011 | Hakola | H04W 24/10 455/452.2 |
| 2012/0071102 A1 | 3/2012 | Palomar et al. | |
| 2012/0155441 A1* | 6/2012 | Rousseau | H04W 84/18 370/337 |
| 2013/0094366 A1* | 4/2013 | Lee | H04L 41/12 370/241 |
| 2013/0223398 A1* | 8/2013 | Li | H04W 72/085 370/329 |
| 2013/0242787 A1* | 9/2013 | Sun | H04L 43/06 370/252 |
| 2014/0018010 A1* | 1/2014 | Gao | H04W 76/023 455/67.13 |
| 2014/0092833 A1* | 4/2014 | Vannithamby | H04J 11/0086 370/329 |
| 2014/0179330 A1* | 6/2014 | Du | H04W 76/043 455/450 |
| 2014/0194132 A1* | 7/2014 | Lim | H04L 5/0037 455/450 |
| 2015/0030011 A1* | 1/2015 | Liu | H04L 1/1893 370/336 |

* cited by examiner

FIG.3

DISTRIBUTED METHOD FOR SELECTING A CONFIGURATION IN MOBILE NETWORKS

CROSS-REFERENCE TO RELATED APPLICATION

This application claims priority to foreign French patent application No. FR 1300804, filed on Apr. 8, 2013, the disclosure of which is incorporated by reference in its entirety.

FIELD OF THE INVENTION

The subject of the invention relates to a distributed method for selecting one or more configurations in mobile networks composed of several groups of nodes or users communicating with one another, each group possessing a group head. Within a group or cluster the nodes or users communicate between one another through conventional communication links.

The invention applies within the framework of decentralized wireless networks. It can also be implemented in any communication system complying with communication rules without having the aid of a network central controller. For example, it is possible to envisage applying the method to small network cells, ad-hoc mobile networks, networks in which the communication devices require an efficacious configuration which consumes little in the way of resources.

The term "distributed" refers to the fact that decisions are taken within a group or cluster, these two terms designating one and the same element.

The term configuration of the nodes within a cluster connotes the set of configuration parameters that the equipment can take into account, for example, communication channels, the power chosen at the level of a node for sending, etc. Use will be made of the expression "radio resource parameter" a parameter representative of the radio resource, such as the sending frequency, the power, the coding method, the modulation used.

BACKGROUND

The networks to which the present invention relates are networks divided into several groups or clusters. Each cluster comprises several nodes and a node called the cluster head which has the role of allocator of resources. This cluster head is elected by techniques known to the person skilled in the art. This type of structure makes it possible to establish ad-hoc communications from peer to peer inside and between the clusters. Once the cluster heads have been chosen, the nodes of a cluster must affiliate to the group head. Once the network has been organized into clusters, it remains to allocate radio resources to allow the communications between the nodes of a cluster while ensuring the qualities of service required or QoS for the communications. The cluster head determines, for example, the transmission channel and the power level to be used by all the nodes which belong to a cluster or in a more general manner, a configuration that is satisfactory for these nodes.

A cluster head having resources in respect of a cluster, it must allocate the resources to the member nodes, for one or more frequencies known to the cluster head. This operation is complex because of the diversity between the types of quality of service QoS required, for example, lag, bitrate, error rate, etc. and the allocating of resources is often posed as an optimization problem. A first approach consists in including the QoS characteristics aimed at in the objective function to be optimized. A second way to envisage the problem is to manage the QoS needs as constraints to the optimization problem. In the latter case, certain works known to the person skilled in the art seek to attain the optimal solution at the price of high computational complexity. Other less complex works do not aim at the optimum while yet offering good performance. An example of this type of approach is to decompose the function for allocating resources into several steps: link allocation, then bandwidth allocation, then optionally allocation of sub-carriers and finally allocation of modulation and coding scheme or MCS jointly with the power.

Patent application US 201210071102 discloses a wireless communication system for implementing a distributed approach, for sharing the frequency spectrum. In this distributed approach, the individual wireless communication devices will negotiate agreements for the use of the available spectrum without involving a centralized authority. The wireless devices will be for example configured to increase the information bitrates of their respective transmissions under predetermined constraints. These predetermined constraints can include transmitted power constraints, interference constraints, for example.

The systems and methods of the prior art known to the Applicant do not, a priori, make it possible to select an optimal system configuration in the presence of operating constraints. They do not make provision to define and manage in a joint manner the frequency or the logical channel and the other configuration parameters.

SUMMARY OF THE INVENTION

The idea of the present invention consists notably in collecting, at the level of each node or link and/or of a set of nodes and of links of a cluster, the value of a parameter of radio resources at the level of a node or link within a cluster, and to determine on the basis of this value an optimal configuration for the nodes notably in terms of quality of service.

The invention relates to a method for determining the configuration of a set of nodes Ni and/or links grouped together within a cluster possessing a cluster head, CHk, with the cluster there being associated a constraint value such as the quality of service QoS to be satisfied and radio resources, the method is characterized in that it comprises at least the following steps:

given a set of operating channels, triggering an information request by interrogating one or more nodes Ni and/or links and asking the said nodes and/or links to evaluate for each communication channel an index l[c] of communication quality for a node or a link between two nodes of the cluster, and then selecting a configuration when the duster head has received the indices of communication quality, the cluster head verifies whether the indices of quality received comply with the given constraint for the cluster, and retains the indices which satisfy the largest number of nodes Ni or links, while minimizing the consumption of the resources, if the configuration retained satisfies the set of nodes Ni or links interrogated, then the cluster head will update the list f of communication channels and will implement this configuration for the nodes or links of the cluster, if not, then the duster head will either update the list of communication channels, or remain in the initial configuration of the set of nodes and/or links.

The information request is, for example, triggered on receipt of an alarm at the level of the cluster head expressing a number of nodes or links of the cluster that are not satisfied by the chosen configuration.

According to a variant, a node or link counts up the number of times that the measured index of quality does not make it possible to satisfy the required constraint and transmits an alarm value to the duster head if the value of the constraint is not satisfied a given number $n_a$ times.

When the cluster head does not find any suitable configuration, d), then, it verifies whether there exists another configuration from among several configuration subsets that are predefined, by testing the subsets according to a given order of priority.

The information request can be triggered by an off-alarm triggering procedure by drawing a random value A uniformly distributed between two values [0, 1] and if the value A is less than a given probability value, then the information request procedure is triggered.

According to another variant embodiment, the information request is triggered using a deterministic mode in which a probability variation law, associated with the information request triggering, is defined for the cluster k.

A variation law, for example, is used where $\pi_k(t)=1$ at determined instants and $\pi_k(t)=0$ otherwise, with $\pi_k(t)$ the probability of triggering an information request procedure for the cluster k.

The cluster head asks the nodes or links to transmit to it the gain/noise plus interference power ratios $Q_m^s$ for all the possible channels m of the pre-established list:

$$Q_m^k = (Q_m^k(1), Q_m^k(2), \ldots, Q_m^k(F))$$

where each element of the vector is defined as:

$$Q_m^k(s) = \frac{G^2(m,m)}{\sigma^2 + MAI_{m,s}}$$

$G^s(m,m)$ represents the gain in power of the channel of the link m belonging to the cluster k, for the channel s, and $MAI_{m,s}$ the multiple access interference, defined as:

$$MAI_{m,s} = \sum_{h \in K \setminus k} 1\{C_h = s\} \left( \sum_{l \in N_h} P_h G^s(l,m) \right)$$

where $G^s(l,m)$ represents the gain in power of the channel between the sender of the link l and the receiver of the link and 1{.} corresponds to a standard indicator function.

The cluster head, on the basis of the vectors received $Q_m^k$, organizes, for example, the vectors received $Q_m^k$ into a matrix G, G(l,f) indicates the element in the l-th row (link) and the f-th column (channel) of the matrix, the element is equal to the f-th element of the vector $Q_l^k$:

$$G = \begin{bmatrix} Q_1^k(1) & Q_1^k(2) & \cdots & Q_1^k(F) \\ Q_2^k(1) & \cdots & & \\ \cdots & & \cdots & \\ Q_{L_k}^k(1) & & & Q_{L_k}^k(F) \end{bmatrix}$$

afterwards, it evaluates the maximum number of links which will make it possible to satisfy the quality of service, $$L_{MAX} = \max_f \sum_l 1\{P_{MAX} G(l,f) \geq \Gamma_l\}$$

afterwards, the matrix G' is constructed by zeroing all the columns of G where $$\sum_l 1(P_{MAX} G(l,f) \geq \Gamma_l) < L_{MAX},$$

the cluster head thereafter chooses a particular value f as a function of the needs of the network as well as the configuration $c_l$ for each link l on the basis of the matrix G(l,f*).

For example, the cluster head, uses a min-max criterion. That is to say it selects the minimum value of the link l* and the channel f* by using the expression:

$$\begin{cases} l^* = \operatorname*{argmin}_l \left\{ \frac{G(l,f)}{\Gamma_l} \text{ such as } \frac{P_{MAX} G'(l,f)}{\Gamma_l} \geq 1 \right\} \\ f^* = \operatorname*{argmax}_f \frac{G'(l^*,f)}{\Gamma_{l^*}} \end{cases},$$

and then the cluster head allots each link a power for the communication:

$$P_l = \left\lceil \frac{\Gamma_l}{G'(l,f^*)} \right\rceil.$$

where the quantization operator ⌈.⌉ gives the smallest quantized value of power greater than $\Gamma_l/(G'(l,f^*))$.

The links l such that $P_{MAX}G'(l,f^*)<\Gamma_l$, are set to zero by allotting them a zero power $P_l=0$.

BRIEF DESCRIPTION OF THE DRAWINGS

Other characteristics and advantages of the device according to the invention will become more apparent on reading the description which follows of an exemplary embodiment given by way of wholly nonlimiting illustration in conjunction with the figures which represent.

DETAILED DESCRIPTION

In the examples which will be given by way of wholly nonlimiting illustration, we shall for example seek to optimize the configuration of the nodes of a cluster so as to comply with a constraint, such as a quality of service, required by an application, to limit the power used in the communications internal to a cluster while complying with a signal-to-noise plus interference level SINR (Signal to Interference plus Noise Ratio). The idea will notably be to determine a radio resource parameter which will lead to an optimal configuration of the nodes of a cluster. For example, it will be possible to assign a value of communication channel and a power level to be used for the transmission of information between nodes of the cluster.

The examples which follow apply in respect of nodes of a network, of the links or of a set of nodes and of links.

The method according to the invention relies notably on the implementation:
1) of a first mode managed by the cluster head which asks the nodes attached to it to give the performance ratings that they receive for a certain number of choices of parameters, and then tailors the configuration of the network as a function of the responses that it receives;
2) of a second mode of alarm originating from the nodes of the cluster which inform the cluster head of the performance ratings and of their degradation with respect to the fixed constraints regarding quality of service QoS. On the basis of a given alarm level, the cluster head will pass to the first mode which will redefine a configuration of the nodes in the cluster.

The method according to the invention presents notably the advantage of adapting the configuration of the nodes of the cluster based on actual evaluations.

Figure 1:
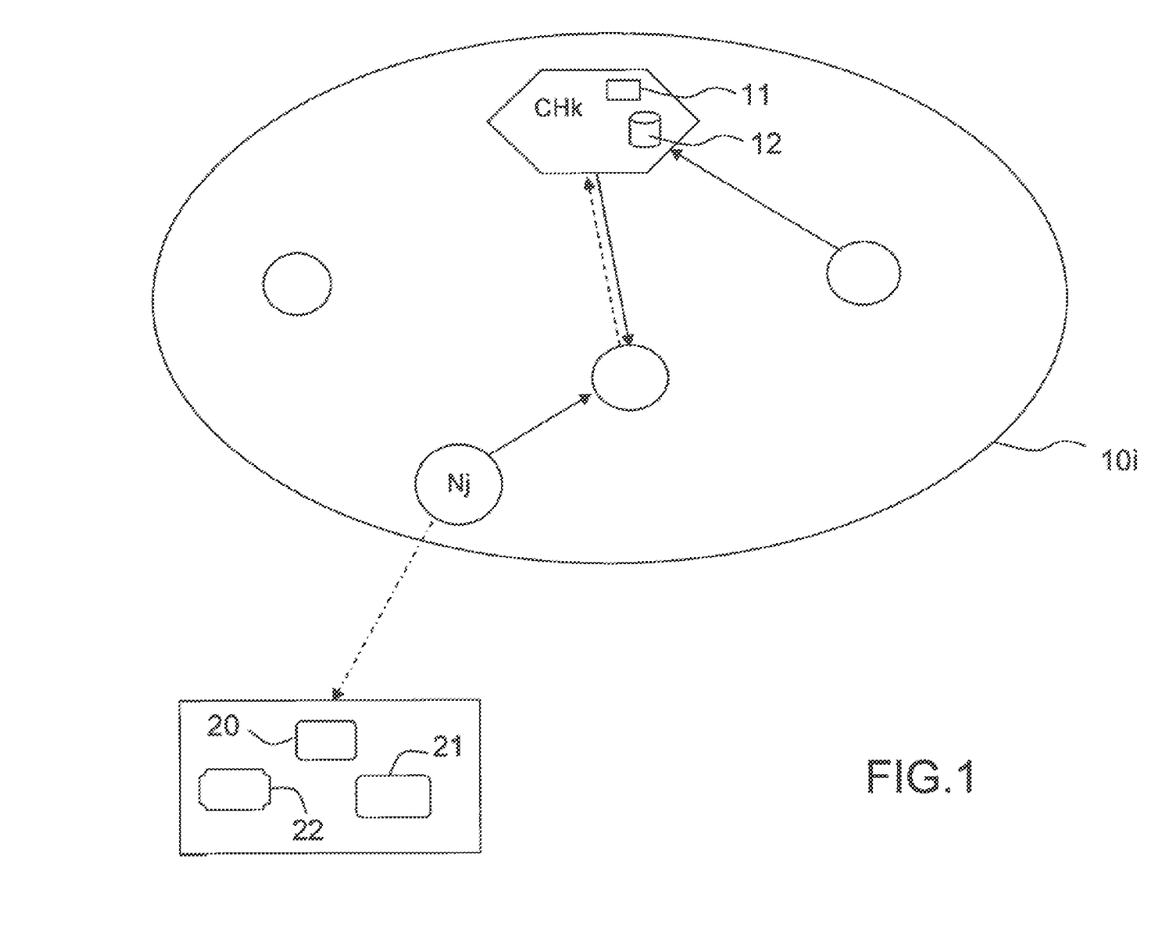
FIG. 1, a representation of several clusters that are independent of one another, a cluster comprising a set of nodes and of a cluster head, FIG. 2, a representation of the procedures and steps implemented by the method according to the invention, and FIG. 3, an example given when the power ratio is considered as parameter.

FIG. 1 represents a set of clusters in a decentralized wireless communication network. Each cluster 10$i$ comprises several nodes Nj and a cluster head CHk. The election of the cluster head is done by a method known to the person skilled in the art which will not be detailed here. It is the cluster head that will decide the optimal configuration to carry out the optimal communication between the nodes of its cluster. The nodes communicate with one another by sharing the total spectrum, possibly creating interference. In the case where there are several clusters, the interference may propagate to the level of the other clusters. A cluster head comprises, for example, a processor 11, a table 12 in which it can store a configuration of nodes for a communication between the nodes, for example, it knows the links Li,j which link the node Ni to the node Nj, and stores this configuration in a set {(Ni, Nj, Li,j), . . . }.

A node Nj comprises, for example, a sender 20 and/or a receiver 21, a processor 22 suitable for executing the orders transmitted by the cluster head. The processor 22 is also programmed to determine the number of times that, in a given configuration, it may not comply with the given constraint and in this case to send an alarm to the cluster head.

In theory the clusters do not communicate with one another and do not exchange their operating parameter's.

For each link in a given cluster k, there is associated a parameter $\Gamma_l$ which defines the minimum quality of service QoS to be complied with for the communication between the nodes. For example; $\Gamma_l$ can be a minimum level of SINR, a probability of correctly receiving packets (measured by checking a CRC), a minimum bitrate, etc. In the example which follows we consider $\Gamma_l$ as the minimum level for the average of SINR.

The global spectrum used for the communication between the nodes within a cluster is divided into F orthogonal channels. For example, a channels set C={1, 2, . . . F} is employed. The time is considered "discretized" and is indexed by the letter t. At each instant, a cluster head CHk will select a communication channel to be used by the senders of the nodes of its cluster. The channel selected by the cluster head CHk is indicated by Fk belonging to F.

The method according to the invention will call upon various procedures detailed hereinafter to determine an optimal configuration of nodes within a cluster.

The following parameters will be used in the subsequent description:
1. $\pi_k(t)$ is the probability of triggering an information request procedure by the cluster head so as to select a new configuration for the nodes,
2. $\pi_{min}$ is the minimum value of $\pi_k(t)$,
3. $\Gamma_{alarm}$ is the maximum quantity of alarms tolerated by the cluster head, before it triggers a new network configuration procedure,
4. $n_{alarm_k}(t)$ is the quantity of alarms received by the cluster head at the instant t,
5. $P_{MAX}$ is the maximum power transmitted by the nodes,
6. $\Gamma_l$ is a performance threshold for the link l,
7. $n_a$ corresponds to the successive time instants for which a node can avoid satisfying its constraints before transmitting an alarm.

Figure 2:
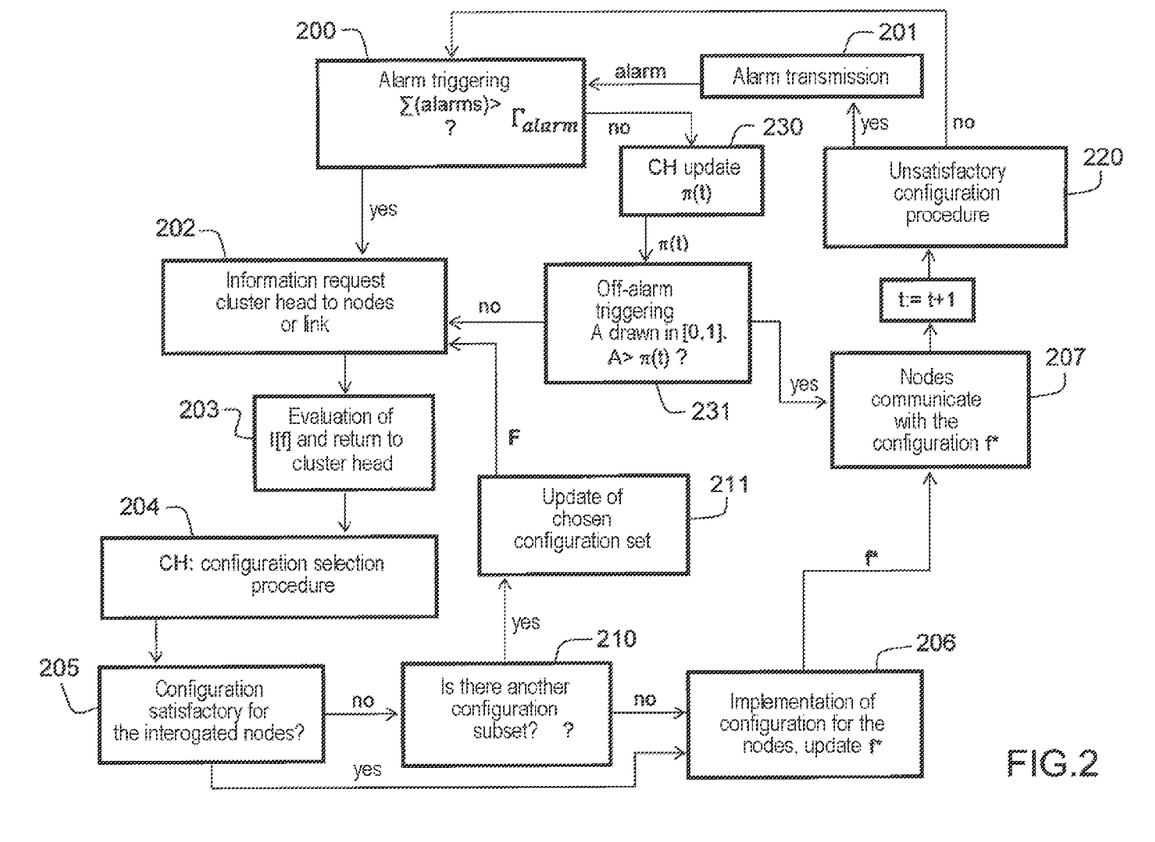

FIG. 2 represents the set of procedures implemented in the method according to the invention.

Initially, the cluster has an initial configuration of nodes communicating with one another and of radio resource parameters. At a given instant t, the cluster head therefore has a list of transmission channels and a set of nodes which communicate with one another while satisfying a given quality of service QoS.

The "alarm triggering" procedure 200, is executed by the processor of the cluster head on receipt of one or more alarm signals originating from one or more nodes. These alarm signals are representative of a parameter $n_a$ corresponding, for example, to the number of times that a link or a node has not been able to comply with the quality of service required by the network. The cluster head is configured with the alarm threshold value $\Gamma_{alarm}$. The processor of the cluster head receives 201 the alarms arising from one or more nodes of the cluster. In the case where the sum of the alarms exceeds the threshold value, then, the cluster head will have to search for a new configuration to satisfy the quality of service QoS. Accordingly, it will trigger an "information request" procedure 202 the objective of which is notably to upload the radio resource parameter values determined at the level of the nodes or of the links interrogated.

If the sum of the alarms is less than the alarm threshold value, then the cluster head will, 230, update the value of probability of triggering the information request procedure and go to the random triggering procedure 231.

The alarm threshold level $\Gamma_{alarm}$, measures the maximum quantity that the cluster head can tolerate before choosing a new configuration.

For example, it is possible to choose as value $\Gamma_{alarm}$=0.8 $N_k$.

The "off-alarm triggering" procedure, 231, is executed by the processor of the cluster head.

This procedure can be carried out by a random triggering procedure, for example. A value $\pi(t)$ which represents the probability of triggering an "information request" procedure is matched with a corresponding cluster head. This value can be hard-coded, defined by the designer of the network, or software-coded, depending on the optimality of the configuration. This value must be a number less than 0.1. It is thus possible to define a probability as a time dependent function for improving the stability and the reactivity of the system:

$$\pi_k(t) := \begin{cases} \max\left(\frac{\pi_k(t-1)}{2}, \pi_{min\_}\right) & \text{if } n_{alarm_k}(t) = 0 \\ \min(2\pi_k(t-1), 1) & \text{if } n_{alarm_k}(t) > 0 \end{cases}$$

$\pi_k(t)$ corresponds to the probability associated with the cluster k where $\pi_{min}$ is the minimum value for the search for new configurations.

The probability of change of configuration measures the frequency at which a cluster head attempts to improve the performance of the network by selecting a new configuration. For example, it is possible to fix n(t)=0.01.

The random mode is selected, for example, by drawing a random variable A uniformly distributed between 0 and 1 and this value is compared with $\pi_k(t)$. If the value A is greater than $\pi_k(t)$, then the information request procedure is not triggered. In the converse case, the "information request" procedure is triggered.

According to another embodiment, a deterministic mode will be used. Accordingly, a law of variation of $\pi_k(t)$ for the cluster k will for example be defined. It is thus possible to define $\pi_k(t)=1$ at determined instants and $\pi_k(t)=0$ otherwise.

The "information request" procedure, 202, starts on a decision of the cluster head receiving alarms or made subsequent to the result of the off-alarm triggering procedure.

As a function of a predefined quality of service objective, the cluster head asks, 203, the nodes Ni forming part of the configuration, to transmit to it a link quality index necessary to define an optimal configuration, for example a vector $I_l[c]$ containing an index of preference for a network configuration. A node will scan the predefined span of channels and acquire or measure the link quality index; the larger this value, the better the transmission configuration for this particular link.

For example, as indices of quality, it is possible to take the measurement of the level of interference in each channel, or the mean-power gain of the channel.

The "configuration selection" procedure 204 is triggered once the cluster head has received all the vectors $I_l[f]$ containing the indices measured for the various channels and the various links or nodes. The cluster head then chooses an optimal configuration for the nodes of the cluster on the basis of these vectors. It will thereafter, 205, verify whether the configuration is satisfactory for the various nodes interrogated or a majority of these nodes, i.e, for which the nodes will satisfy a given quality of service or constraint.

If yes, 205, the cluster head triggers the configuration retained for the nodes and updates, 206, the set of communication channels f*. The nodes will communicate with this configuration f* of channels, 207.

If the cluster head does not find any satisfactory configuration, then it will verify, 210, whether there exists another configuration from among configuration subsets that are predefined. These subsets are numbered, and the subsets are tested according, for example, to an increasing order or a given order of priority. If this configuration exists, it will, 211, update the set of channels f, by using the parameters of this configuration. If the method does not find any configuration for the set of nodes, then it will use the configuration which satisfies the largest number of nodes so as to update the set of channels.

For example, it is possible to conceive of dividing the spectrum into two or more sets characterized by different priority levels, civilian communication band, military communication band. In this case, the cluster head asks the nodes to scan the bands of low priorities. If no optimal channel is found, the cluster head will ask to scan other bands until an available band is found.

Figure 3:
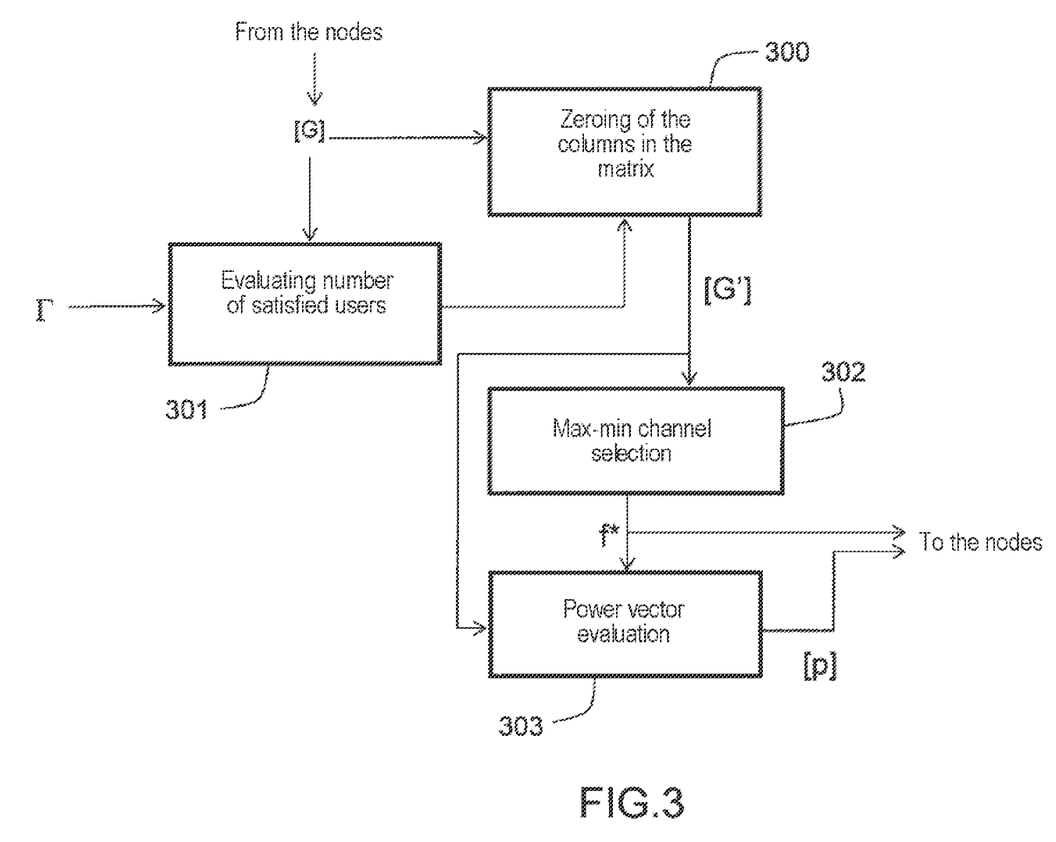

The cluster head organizes the preference vectors received into a matrix G. In this example, the matrix G is such that G(l,f) corresponds to the mean-power gain of the channel of a communication link l, on the channel f. A row of the matrix corresponds to the various links interrogated by the cluster head, a column corresponds to the various channels for which the nodes have been interrogated.

The cluster head evaluates, 301, the maximum number of links which satisfy the required quality of service:

$$L_{MAX} = \max_f \sum_l 1_{[f(g(l,f)) \geq \Gamma_l]},$$

where $1_{(.)}$ represents the indicator function and f(.) is a certain function which depends on the nature of the matrix G. In this example, the value $L_{MAX}$ may be:

$$L_{MAX} = \max_f \sum_l 1_{\left\{G(l,f) \geq \frac{\Gamma_l}{P_{MAX}}\right\}},$$

where $P_{MAX}$ represents the maximum transmitted power that a node can use.

The cluster head reduces the matrix G to a matrix G', by using a column elimination method 300 which cancels from the matrix G all the columns (i.e the channels) which do not satisfy $L_{MAX}$ links.

In this example, the selected channel is given, 302, by using the following max-min expression:

$$\begin{cases} l^* = \operatorname*{argmin}_l \left\{ \frac{G'(l,f)}{\Gamma_l} \text{ such as } \frac{P_{MAX} G'(l,f)}{\Gamma_l} \geq 1 \right\} \\ f^* = \operatorname*{argmax}_f \frac{G'(l^*,f)}{\Gamma_{l^*}} \end{cases},$$

i.e., the selected channel is that which maximizes the link giving the poorest performance.

The channel f* will be used for the communication by all the links belonging to the cluster. The power to be allotted for each link is selected, 303, as a function of the nature of the vector I[f].

In this example, the following formula can be used:

$$P_l = \left\lceil \frac{\Gamma_l}{G'(l,f^*)} \right\rceil,$$

where the quantization operator $\lceil z \rceil$ gives the smallest quantized value of power greater than z.

A power equal to zero is assigned to each link which does not satisfy this criterion.

Everything that has just been described for the configuration selection procedure within the framework of links applies for nodes of a cluster.

A "satisfaction check" procedure 220 is used by the links to ask for re-evaluation of a network configuration. This procedure is used by the links which are discarded by the method. If for some arbitrary reason, for a number $n_a$ of consecutive instants, the node does not satisfy the criterion SINR<$\Gamma_l$ then it will transmit an alarm, 201, to the alarm triggering procedure. It is possible to fix $n_a$=2.

The subsequent description is given while taking as measurement parameter the power/channel gain ratio Q to determine the optimal configuration of the nodes of the network. A list of channels is predefined with respect to an initial configuration, known to the cluster head, of a network.

The head of the cluster k triggers the information request procedure and asks a receiver node of a link to transmit to it a vector containing all the gain/noise plus interference power ratios $Q_m^s$ for all the possible channels m of the pre-established list:

$$Q_m^k = (Q_m^k(1), Q_m^k(2), \ldots, Q_m^k(C)),$$

where each element of the vector is defined as:

$$Q_m^k(s) = \frac{G^s(m,m)}{\sigma^2 + MAI_{m,s}}$$

$G^s(m,m)$ represents the gain in power of the channel of the link m belonging to the cluster k, for the channel s, and $MAI_{m,s}$ is the multiple access interference, defined as:

$$MAI_{m,s} = \sum_{h \in K \backslash k} 1\{C_h = s\} \left( \sum_{l \in N_h} P_h G^s(l,m) \right)$$

where $G^s(l,m)$ represents the gain in power of the channel between the sender of the link l and the receiver of the link and 1{.} corresponds to a standard indicator function. Each link or node of the network comprises a module suitable for estimating the value $Q_m^k(s)$. A receiver node is suitable for checking the quality of the communication at each frame transmitted, by measuring the average SINR of a packet. This value SINR is thereafter compared with a threshold value of quality of service to be complied with QoS.

Therefore at the end of the information request procedure the cluster head has a set of values $Q_m^s$.

The threshold level of quality of service measures the minimum performance that node or link must comply with. For example, in the case of a minimum performance with respect to a value SINR: $SINR_m > \Gamma_m$, with $SINR_m$, i.e., the average signal-to-noise ratio achieved from link m, defined as:

$$SINR_m = \frac{P_m G^s(m,m)}{\sigma^2 + MAI_{m,s}},$$

where $P_m$ represents the power used by the link m for transmission.

One of the objectives of the method according to the invention is to obtain an SINR value larger than or equal to the threshold value $\Gamma_l$ while using a minimum value of power.

Accordingly, the cluster head organizes the vectors received $Q_m^k$ into a matrix G. G(l,f) indicates the element in the l-th row (link) and the f-th column (channel) of the matrix, the element is equal to the f-th element of the vector $Q_l^k$:

$$G = \begin{bmatrix} Q_1^k(1) & Q_1^k(2) & \ldots & Q_1^k(F) \\ Q_2^k(1) & \ldots & & \\ \ldots & & & \ldots \\ Q_{L_k}^k(1) & & & Q_{L_k}^k(F) \end{bmatrix}$$

The cluster head thereafter evaluates the maximum number of links which will make it possible to satisfy the constraints, for example $$L_{MAX} = \max_f \sum_l 1\{P_{MAX}(G(l,f)) \geq \Gamma_l\}$$

The power value $P_{MAX}$ is a known value for the network. The function 1{..} is the indicator function which equals 1 when the condition is true and 0 if the condition is false.

The cluster head will thereafter perform a reduction of the size of matrix G into a matrix G', by applying a method for eliminating columns which zeros all the columns of the matrix G, i.e. the channels, which do not satisfy the criterion $L_{MAX}$. That is to say, no maximum is found for these channels. For the selected channels which satisfy the constraints, the optimal channel will be chosen. Accordingly, the following max-min expression is for example used $$\begin{cases} l^* = \arg\min_l \left\{ \frac{G'(l,f)}{\Gamma_l} \text{ such as } \frac{P_{MAX} G'(l,f)}{\Gamma_l} \geq 1 \right\} \\ f^* = \arg\max_f \frac{G'(l^*,f)}{\Gamma_{l^*}} \end{cases},$$

The minimum value of the link l* is chosen and then the channel f* is chosen.

The channel which will be selected is the one which maximizes the performance of the poorest link. It is possible to satisfy the QoS constraints for a maximum number of links. The channel f* is thereafter used by all the links belonging to the cluster k to communicate with one another.

The cluster head will thereafter allot each link a power for communication, for example the power for a link l will be chosen:

$$P_l = \left\lceil \frac{\Gamma_l}{G'(l,f^*)} \right\rceil,$$

where the quantization operator $\lceil z \rceil$ gives the smallest quantized value of power greater than z. The links which cannot satisfy this constraint, i.e, all the links l such that $P_{MAX}G'(l,f^*) < \Gamma_l$, are set to zero by allotting them a zero power $P_l$=0.

The explanations given above apply when it is sought to obtain an optimal configuration for a network comprising one or more mutually independent clusters, each cluster comprising a cluster head whose function is to manage the configuration of the nodes, and the allocation of the resources. A configuration can be the choice of the logical channels, of the frequencies, the power used for the communications, the coding scheme for data transmissions. The constraints to be complied with may be, for example, a value of SINR, a probability of receiving erroneous packets, the optimization of a transmission bitrate.

The invention applies notably in tactical networks comprising several clusters. Within the framework of tactical situations, it is beneficial to be able to manage the resources of the radio networks in a distributed or locally centralized manner so as to minimize the signalling, the vulnerability, and allow a faster reaction time.

ADVANTAGES

The method according to the invention makes it possible for a configuration of nodes of a network and a frequency, or logical channel, to be determined jointly. The configuration can adapt itself by virtue of actual measurements for a given configuration of a network.

The invention claimed is:

1. A method for determining a configuration of a set of nodes Ni and/or links grouped together within a cluster possessing a cluster head, CHk, with the cluster there being associated a constraint value to be satisfied and radio resources, comprising at least the following steps:
given a set of operating channels, triggering an information request on receipt of an alarm at a level of the cluster head expressing a number of nodes or links of the cluster that are not satisfied by a chosen configuration by interrogating one or more nodes Ni or links and asking the nodes or the links to evaluate for each communication channel an index $I_l[c]$ of communication quality for a node or a link between two nodes of the cluster, and then selecting a configuration when the cluster head has received the indices of communication quality of the interrogated nodes or links,
the cluster head verifies whether the indices of quality received comply with a given constraint for the cluster, and retains the indices of quality which satisfy the largest number of nodes Ni or links and triggers a configuration selection procedure,
if the configuration retained satisfies the set of nodes Ni or links interrogated, then the cluster head will update a list c of communication channels and will communicate this configuration for the nodes or links of the cluster,
if not, then the cluster head will either update the list of communication channels, or remain in an initial configuration of the set of nodes or links,
wherein a node or link counts a number of times that the respective index of communication quality does not make it possible to satisfy the given constraint and transmits an alarm value to the cluster head if the value of the given constraint is not satisfied a given number $n_a$ times.

2. The method according to claim 1, wherein when the cluster head does not find any suitable configuration, d), then, the cluster head verifies whether there exists another configuration from among several configuration subsets that are predefined, by testing the subsets according to a given order of priority.

3. The method according to claim 1, wherein the information request is triggered by an off-alarm triggering procedure by drawing a random value A uniformly distributed between two values [0, 1] and if the random value A is less than a given probability value, then an information request procedure is triggered.

4. The method according to claim 1, wherein the information request is triggered using a deterministic mode in which a probability variation law, associated with the information request triggering, is defined for the cluster.

5. The method according to claim 4, wherein a variation law is used where $\pi_k(t)=1$ at determined instants and $\pi_k(t)=0$ otherwise with $\pi_k(t)$ the probability of triggering an information request procedure for the cluster k.

6. The method according to claim 1 wherein the cluster head asks the nodes or links to transmit to the cluster head gain/noise plus interference power ratios $Q_m^s$ for all possible channels m of a pre-established list:

$$Q_m^k = (Q_m^k(1), Q_m^k(2), \ldots, Q_m^k(F)),$$

where each element is defined as:

$$Q_m^k(s) = \frac{G^s(m, m)}{\sigma^2 + MAI_{m,s}}$$

$G^s(m,m)$ represents a gain in power of a communication channel of link m belonging to cluster k, for channel s, and $MAI_{m,s}$ the multiple access interference, defined as $$MAI_{m,s} = \sum_{h \in K \backslash k} 1\{C_h = s\} \left( \sum_{l \in N_h} P_h G^s(l, m) \right)$$

where $G^s(l,m)$ represents a gain in power of the communication channel between a sender of link l and a receiver of the link l and $1\{.\}$ corresponds to a standard indicator function, on the basis of the vectors received $Q_m^k$, the cluster head organizes the vectors received $Q_m^k$ in a matrix G, G(l,f) indicates the element in the l-th row (link) and the f-th column (channel) of the matrix, the element is equal to the f-th element of the vector $Q_l^k$:

$$G = \begin{bmatrix} Q_1^k(1) & Q_1^k(2) & \ldots & Q_1^k(F) \\ Q_2^k(1) & \ldots & & \\ \ldots & & \ldots & \\ Q_{L_k}^k(1) & & & Q_{L_k}^k(F) \end{bmatrix}$$

afterwards, it evaluates the maximum number of links which is suitable for satisfying the quality of service, $$L_{MAX} = \max_f \sum_l 1\{P_{MAX}(G(l, m)) \geq \Gamma_l\}$$

the matrix G' is thereafter constructed by zeroing all the columns of G where $$\sum_l 1(P_{MAX} G(l, f) \geq \Gamma_l) < L_{MAX},$$

the cluster head thereafter chooses a particular value f* as a function of the needs of the network as well as the configuration $c_l$ for each link l on the basis of the matrix G(l,f*).

7. The method according to claim 6, wherein the cluster head uses a min-max criterion, the cluster head selects the minimum value of the link l* and the channel f* by using an expression:

$$\begin{cases} l^* = \underset{l}{\operatorname{argmin}}\left\{\frac{G'(l,f)}{\Gamma_l} \text{ such as } \frac{P_{MAX}G'(l,f)}{\Gamma_l} \geq 1\right\} \\ f^* = \underset{f}{\operatorname{argmax}} \frac{G'(l^*,f)}{\Gamma_{l^*}} \end{cases}$$

and then the cluster head allots each link a power for the communication:

$$P_l = \left\lceil \frac{\Gamma_l}{G'(l,f^*)} \right\rceil,$$

where a quantization operator $\lceil . \rceil$ gives the smallest quantized value of power greater than $\Gamma_l/(G'(l,f^*))$.

8. The method according to claim 7 wherein the links l such that $P_{MAX}G'(l,f^*)<\Gamma_l$, are set to zero by allotting them a zero power $P_l=0$.

9. The method according to claim 6 wherein the links l such that $P_{MAX}G'(l,f^*)<\Gamma_l$, are set to zero by allotting them a zero power $P_l=0$.

10. The method according to claim 1 wherein the constraint to be satisfied is a quality of service.

11. The method according to claim 1 wherein, for the configuration of nodes or links in an ad-hoc mobile network.

\* \* \* \* \*